United States Patent Office 3,541,035
Patented Nov. 17, 1970

3,541,035
ETHYLENE-ACRYLIC ACID COPOLYMERS
AS WAX ADDITIVES
Bernard O. Baum, Ridgewood, Wilmington, Del., assignor to Union Carbide Corporation, a corporation of New York
No Drawing. Continuation-in-part of application Ser. No. 203,470, June 19, 1962. This application Oct. 12, 1965, Ser. No. 495,339
Int. Cl. C08f 45/52
U.S. Cl. 260—28.5     5 Claims

ABSTRACT OF THE DISCLOSURE

A wax composition comprising a wax and from about 2 to about 60 weight percent of either an ethylene/acrylic acid copolymer consisting of from about 10 to 40 weight percent combined acrylic acid and from 60 to 90 weight percent combined ethylene or an ethylene/vinyl ester/acrylic acid terpolymer comprising from about 65 to 96 weight percent of combined ethylene, from 1 to about 25 percent of combined vinyl ester and from about 3 to 10 percent by weight of combined acrylic acid. This combination provides wax having markedly improved adhesive strength, seal strength and protective properties.

---

This application is a continuation-in-part of application Ser. No. 203,470, filed June 19, 1962 and now abandoned.

This invention relates to novel wax formulations having improved physical properties. In a particular aspect, this invention relates to novel compositions which comprise mixtures of a wax with polymers containing ethylene and acrylic acid polymerized in the polymer.

Waxes have long been used as coatings for paper, cloth, cardboard and like products to render these products resistant to moisture. Such waxes, however, often crack and peel off the coated article due to their low tensile strength and poor ductility, and they seldom display good seal strengths. In order to improve the tensile strength and ductility of a wax it has been a common practice in the past to add small amounts of polyethylene to a wax. Clear solutions of a wax, for example paraffin wax, and polyethylene can be obtained by heating and stirring a mixture of the two components at a temperature above 120° C. A fine dispersion of the polyethylene in the wax can be obtained by stirring the mixture until it has cooled to practically its solidification point. However, with the use of a formulation in which the polyethylene is very finely dispersed in the wax only a limited improvement in the tensile strength and ductility of the mixture is realized. In addition, the vigorous stirring of the mixture throughout the cooling period which is necessary to effect dispersion causes air bubbles, which interfere with, or prevent, the formation of continuous wax coatings or impregnations of the wax composition on the paper. However, if the rate of stirring is decreased a fine dispersion cannot be effected, and, as the temperature of the wax-polyethylene mixture decreases, a "cloud point" is reached at a temperature about 25–30° C. above the melting point of the wax. At this point, separation of the mixture into two phases occurs, and the liquid becomes cloudy. One phase is composed of wax plus a small amount of dissolved polyethylene; the other phase consists of solid polyethylene particles. Such two-phase mixtures show little or no improvement in physical properties over unmodified wax.

It is disclosed in U.S. Pat. No. 2,877,196 that ethylene-vinyl acetate copolymers are more compatible with petroleum waxes than is polyethylene and that no phase separation or cloud point is observed until the freezing point of the wax itself is reached. While such compositions provide superior results over the use of polyethylene, the seal strengths of such wax-copolymer compositions are not sufficiently high to render the compositions useful for a number of applications for which they might otherwise be well suited.

According to the present invention, it has been discovered that the addition of even a small amount of an ethylene-acrylic acid copolymer upgrades markedly the adhesive strength, seal strength, and protective properties of wax. The term "ethylene-acrylic acid copolymer" as used herein is defined as the product of a polymerization reaction of one or more different monomeric species with ethylene, as long as one monomer is always acrylic acid. Thus, the term includes specific ethylene-acrylic acid copolymers, terpolymers, quadripolymers, and other multi-component polymeric materials containing a major amount of ethylene and a minor amount of acrylic acid polymerized therein.

Such copolymers may be prepared by copolymerizing ethylene and acrylic acid, together or in combination with a monomer or monomers copolymerizable therewith and fully described hereinbelow, using any one of several processes well-known in the art, such as the process disclosed in U.S. Pat. No. 2,391,218 to Bacon and Richards.

A copolymer containing combined ethylene as the major constituent and combined acrylic acid as the minor constituent, by weight, can be used as an adhesion-improving wax additive in this invention.

The copolymers consisting of ethylene and acrylic acid should have from about 60 to about 90 weight percent combined ethylene with the balance being combined acrylic acid i.e. from about 10 to 40 weight percent. The terpolymers of ethylene, a vinyl ester, and acrylic acid should contain from about 65 to 96 weight percent combined ethylene, from about 1 to about 25 weight percent of combined copolymerizable vinyl ester, and from about 3 to about 10 weight percent of combined acrylic acid. The combined presence of both vinyl ester and acrylic acid in the terpolymer effects a synergism in that greater adhesion is provided in wax blends than a similar amount of either combined acrylic acid or vinyl ester alone. This synergism results in less need for combined monomer with the ethylene or a lesser amount of the copolymer additive to the wax.

By the term "vinyl ester" as used herein is meant monoolefinically unsaturated organic ester monomer containing the vinyl group $>C=C<$. The vinyl group which characterizes this class of esters can be present in either the acid constituent of the ester as in for example the lower alkyl acrylic acid esters or the "alcohol" constituent of the ester as in for example vinyl alcohol esters. Illustrative of copolymerizable vinyl esters which can be combined in the terpolymers useful in the present invention are vinyl formate, vinyl acetate, vinyl chloroacetate, vinyl glycolate, vinyl cyanoacetate, vinyl propionate, vinyl butyrate, vinyl isobutyrate, vinyl 3-methoxypropionate, vinyl benzoate, vinyl cyclohexaneacetate, vinyl 2-hexanoate, vinyl nonanoate, vinyl 10,11-epoxyundecanoate, vinyl stearate, ketene dimer, methyl acrylate, ethyl acrylate, 2 - chloroethyl acrylate, 2 - cyanoethyl acrylate, 2,3-epoxybutyl acrylate, n-butyl acrylate, t-butyl acrylate, 2-ethoxyethyl acrylate, 2-dimethylaminoethyl acrylate, hexyl acrylate, 2-phenoxyethyl acrylate, 5-ethyl-2-pyridylethyl acrylate, dodecyl acrylate, methyl methacrylate, 2,3-epoxypropyl methacrylate, n-butyl methacrylate, t-butyl methacrylate, 2-(o-nitrophenoxy) ethyl methacrylate, 2-ethyl hexyl methacrylate, methacrylate ester with polyethylene glycol, isopropenyl acetate; allyl esters such as allyl carbamate, allyl acetate, allyl 2-ethylhexanoate, and cinnamyl acetate; butenoic esters such as the methyl and ethyl esters of 2-hydroxy-3-butenoic acid and the ethyl and allyl esters of 2-hydroxy-3-methyl-3-butenoic acid, dimethyl, diethyl, dipropyl, and dibutyl maleates, and bis(2 - ethylhexyl) maleate; esters of maleamic acid; esters of fumaric acid; esters of itaconic acid and aconitic acid; the acetate ester of 1-propen-1-ol; the 1-diol diacetate of 2-butene-1; and crotonic acid esters such as 2 - chloroethyl crotonate, the ethylene glycol monoester of crotonic acid, the lower alkyl crotonates, 2,3-epoxypropyl crotonate, 2-phenoxyethyl crotonate, 4-hydroxy ethyl crotonate, and 3-cyanoethyl isocrotonate, and the like.

The vinyl esters copolymerizable in the terpolymers of this invention generally contain from 3 to 15 carbon atoms inclusive.

Preferred vinyl esters in the terpolymers used in this invention are the lower alkanoic acids of vinyl alcohols, such as vinyl acetate and the lower alkyl esters of acrylic and methacrylic acid such as ethyl acrylate, butyl acrylate, methyl methacrylate and the like. All of these waxes are useful in this invention. For most applications, a paraffin wax a mixture of hydrocarbons composed chiefly of normal alkanes having from 26 to 30 carbon atoms and melting within the temperature range 52–57° C., is the preferred wax.

The copolymer used as an additive can comprise from about 2.0 to about 60 weight percent based on the weight of the wax. About 2 to 5 weight percent additive is preferred for general adhesive use, and about 15 to 40 weight percent for hot melt adhesive applications. The ethylene-acrylic acid copolymers exhibit particular utility in wax based hot melt adhesive compositions and is the preferred additive in such compositions. The ethylene-vinyl ester ester-acrylic acid terpolymer resins are preferred additives for wax coating compositions where they impart a high degree of adhesion particularly at relatively low concentrations. To make the wax more tough and scuff-resistant, about 5 to 20 weight percent additive is used. For use as a coating for milk cartons, a particularly important application, from 20 to 60 weight percent copolymer additive is preferred.

The wax-copolymer formulation may contain stabilizers, antioxidants, colorants, processing aids, pigments, and other additives. A large number of common fillers, such as carbon blacks, polyethylene, clays, magnesium silicates, silica, and the like, are also accepted with ease by the formulation and may be added if desired where cloud point is not critical.

Application of the wax-copolymer coating to substrates may be effected in any convenient manner. Knife coating, pinch roll coating, and certain coating techniques have been found to be satisfactory methods of application.

The wax-copolymer formulations of this invention adhere well to substrates to which wax alone will adhere. In addition, these formulations adhere tenaciously to many substrates, for example other wax surfaces, polyethylene surfaces, and wax-polyethylene surfaces, to which wax alone adheres poorly, if at all.

The following descriptions and examples will serve to illustrate the invention, but should not be construed as a limitation thereof. Unless otherwise indicated all parts and percentages are by weight, with the copolymers indicated as weight percent of monomer polymerized therein.

EXAMPLE I

A 95 to 98 g. sample of paraffin wax, a mixture of solid, benzene-soluble hydrocarbons of specific gravity 0.890 and melting point 54° C., was heated to 115° C. in a 600 ml. beaker. The wax was then agitated using a mechanical stirrer and the indicated copolymer additive mixed into the melt. Stirring was continued until the additive was dissolved; in some cases an increase in temperature was required to effect complete dissolution of the additive. The molten solution or a portion thereof was then applied to the desired substrate and spread with a heated (100° C.) Number 12 Meyer bar.

Adhesion testing was conducted by placing coated sides of the substrate and the comparison sample together and sealing with heat by use of a 1″ x 12″ bar heated to 180° F. A two-second cycle at a pressure of 10 p.s.i. was employed. The cooled samples were then delaminated on a Scott Tensile Tester, which had a range of from 0 to 1,000 grams and a spread of from 0 to 1,000 grams and a spread of six inches per minute.

For purposes of comparison, control experiments were conducted on wax compositions containing no additives, containing polyethylene, and containing ethylene-vinyl acetate copolymers.

To determine the cloud point, the solution of paraffin wax and the additive under consideration was heated until it became clear. The solution was then cooled in a 20 ml. test tube as high as 10,000 or they may be a very high molecular weight materials having melt indices as low as 0.1 or 0.0. Preferred is an ethylene-acrylic acid copolymer having a melt index of from about 0 to about 500.

Addition of ethylene-acrylic acid copolymer, ethylene-ethyl acrylate-acrylic acid copolymers or ethylene-acrylic acid-vinyl acetate copolymers to wax approximately doubles or triples, or even more greatly improves, the adhesive ability of wax, or of wax to which has been added polyethylene or ethylene-vinyl acetate copolymer.

By the term "wax" as employed herein is meant any one of a class of solid substances which, in general, is characterized by a waxy feel, a melting point above about 37° C. and below about 100° C., insolubility in water, at least partial solubility in such solvents as alcohol and ether, and usually complete solubility in oils, fats, and especially in common hydrocarbon solvents such as benzene, toluene, xylene, and the like. The mineral waxes, for example petroleum, paraffin, and microcrystalline waxes, consist chiefly of higher hydrocarbons. The natural waxes are mainly esters of higher monohydric alcohols with higher fatty acids and have the general formula $RCO_2R'$, where R and R' are usually normal alkyl groups of more than ten carbon atoms. Representative examples of waxes are spermaceti, beeswax, and Chinese insect wax, all of which are obtained from animals sources; ozokerite, montan, ceresin, and paraffin, from mineral sources; and carnauba wax, Papan wax, bayberry wax, candelilla wax, and jojoba wax (hydrogenated jojoba oil) from vegetable sources. In addition, there is a number of artificial waxes obtained from the distillation of paraffin-base petroleum and ozokerite and from the destructive distillation of lignite and paraffinaceous shales, as well as purely synthetic waxes such as Fischer-Tropsch methacrylate and the like. Such preferred vinyl esters generally contain from about 4 to about 8 carbon atoms inclusive. The preference for the vinyl esters indicated above is dictated by the low cost, availability and ease of copolymerization which such esters display. They also provide excellent synergistic properties with acrylic acid when combined with ethylene and blended into wax.

In the terpolymeres useful in this invention the vinyl esters are present in a preferred amount of from one to twenty-five weight percent based on weight of the terpolymer. The acrylic acid constituent of the terpolymer is present in a preferred amount of from about 3 to about 10 percent by weight. The ethylene constituent in the terpolymer is present in an amount from about 65 to about 96 weight percent.

Ethylene-vinyl acetate-acrylic acid copolymers are especially preferred because they combine excellent adhesivity with low cloud point temperatures. The cloud point temperature of these terpolymers decreases as the vinyl acetate content increases; with the added adhesivity resulting from the polar carboxylate groups of the combined acrylic acid a unique combination of properties is obtained. A low cloud point temperature, which indicates greater solubility of the additive in the wax, permits application of a wax additive formulation to substrates at a much lower temperature (as much as 50° F. lower in the case of these copolymers by comparison with polyethylene-wax formulations).

The molecular weight, melting and softening points, and related physical properties of the ethylene-acrylic acid copolymers of this invention are not particularly critical. For example, these copolymers can range from the low molecular weight waxes and greases having melt indices (as determined on an ICI Grader at 190° C. and 44 p.s.i. according to ASTM Method D-1238-57T) containing a thermometer which reached below the surface of the liquid. The first appearance of a suspension was considered to be the cloud point. A microscope light was used as an aid in finding evidence of initial suspension.

Table I compiles data collected from adhesion experiments in which the delamination procedure described earlier was employed. The superiority of ethylene-acrylic acid copolymers as improvers of the adhesion of paraffin wax to (A) glassine paper, 20 pounds per ream, coated with paraffin wax, (B) brown wrapping paper, 50 pounds per ream, coated with a polyethylene-wax mixture containing 20 weight percent paraffin wax, (C) and milk carton stock, 80 pounds per ream, coated with polyethylene, is demonstrated.

TABLE I

| Composition of polymer additive, at 2% (two parts polymer per 100 parts combined weight of wax plus polymer in paraffin wax) | Adhesion (gms./inch) to glassine paper |
| --- | --- |
| Controls: | |
| (1) No additive | 2.3 |
| (2) Polyethylene (melt index=255; density=0.910) | 8 |
| (3) Ethylene-vinyl acetate copolymer (26.2 weight per cent vinyl acetate; melt index=6) | 9 |
| Copolymers of this invention: | |
| (4) Ethylene-acrylic acid (9 weight percent acrylic acid; melt index=0; density=0.948) | 14 |
| (5) Ethylene-ethyl acrylate-acrylic acid (1.2 weight percent ethyl acrylate, 3.6 weight percent acrylic acid; melt index=0.7) | 16 |
| (6) Ethylene-acrylic acid-vinyl acetate (3.5 weight percent vinyl acetate, 5.2 weight percent acrylic acid; melt index=0.2) | 27 |
| (7) Ethylene-acrylic acid-t-butyl acrylate (3 weight percent acrylic acid, 6 weight percent t-butyl acrylate; melt index=3.4) | 17 |

| | Adhesion (gms./inch) to polyethylene-paraffin wax (80:20) coated wrapping paper |
| --- | --- |
| (8) Ethylene-ethyl acrylate-acrylic acid (1.2 weight percent ethyl acrylate, 3.6 weight percent acrylic aicd; melt index=0.7) | 19 |

| | Adhesion (gms./inch) to milk carton stock coated with polyethylene |
| --- | --- |
| (9) Ethylene-ethyl acrylate-acrylic acid (1.2 weight percent ethyl acrylate, 3.6 weight percent acrylic acid; melt index=0.7) | 23 |

EXAMPLE II

Table II compiles adhesivity data for copolymers of (1) ethylene and acrylic acid, (2) ethylene, acrylic acid and ethyl acrylate, and (3) ethylene, acrylic acid, and vinyl acetate, using the same paraffin wax, preparation, and testing procedure set forth in Example I.

TABLE II

| Composition of polymer additive at 2%, in paraffin wax | Weight percent organic ester in copolymer | Weight percent acrylic acid | Adhesion (gms.) inch |
| --- | --- | --- | --- |
| Ethylene-acrylic acid | | 3 | 9 |
| Do | | 9 | 14 |
| Do | | 18 | 19 |
| Do | | 35 | 31 |
| Ethylene-ethyl acrylate-acrylic acid | 11 | 2.4 | 12 |
| Do | 25 | 2.5 | 31 |
| Do | 2.8 | 3.6 | 16 |
| Do | 4.2 | 4.9 | 23 |
| Do | 0.4 | 4.9 | 13 |
| Do | 10.0 | 15 | 61 |

Table II demonstrates that the above-mentioned copolymers are useful over wide ranges of ester concentrations.

EXAMPLE III

Table III compiles further adhesivity data collected from tests conducted in the same manner as described in Example I.

TABLE III

| Composition of polymer additive in paraffin wax | Weight percent additive | Weight percent ethyl acrylate | Weight percent acrylic acid | Adhesion (gms./inch) |
| --- | --- | --- | --- | --- |
| Ethylene-acrylic acid | 0.5 | 0 | 18 | 8 |
| Do | 2 | 0 | 18 | 19 |
| Do | 30 | 0 | 18 | 61 |
| Do | 60 | 0 | 18 | 70 |
| Ethylene-ethyl acrylate-acrylic acid | 0.5 | 1.2 | 3.6 | 8 |
| Do | 2 | 1.2 | 3.6 | 16 |
| Do | 30 | 1.2 | 3.6 | 74 |
| Do | 60 | 1.2 | 3.6 | 80 |

It will be noted that only 0.5 weight percent ethylene-acrylic acid copolymer was required to increase the adhesion of paraffin wax to 8 gms./inch. By comparison, 2.0 weight percent ethylene-vinyl acetate copolymer was required to effect an increase in adhesivity to about the same level.

EXAMPLE IV

In order to demonstrate the great improvement in adhesivity which results from addition of small amounts of the copolymers of this invention to any type of wax, the following experiments were conducted and the results compiled in Table IV. Preparation of the sample for testing and the adhesivity testing procedure employed is as described in Example I except that for paraffin were substituted the following waxes: (1) microcrystalline wax, a refined petrolatum fraction with a melting point in the range of 145–210° F.; (2) spermaceti, an animal wax of 0.950 specific gravity; (3) carnauba wax (refined), a vegetable wax having a specific gravity of 0.992, an acid value of 3.6, a saponification value of 81, and a solidification point of 87° C.; (4) a synthetic polyether (polyoxyethylene wax having an average molecular weight of about 1500, a specific gravity of 1.15, a flash point of 430° F., and a melting point in the range of 30–40° C.).

The composition of the ethylene-vinyl acetate-acrylic acid copolymer, which was added at 2 percent (two parts polymer per 100 parts combined weight of wax plus polymer) in all cases, was 91.3 weight percent combined ethylene, 3.5 weight percent combined vinyl acetate, and 5.2 weight percent combined acrylic acid. The copolymer had a melt index of 0.2.

TABLE IV.—ADHESIVITY OF WAX-COPOLYEMR FORMULATIONS

| Wax | Adhesion (gms./inch) | |
|---|---|---|
| | Control (no additive) | Wax plus ethylene-vinyl acetate-acrylic acid copolymer at 2% |
| Microcrystalline wax | 1.5 | 22 |
| Spermaceti | 2.7 | 28 |
| Carnauba wax | 3.1 | 31.7 |
| Polyoxyethylene wax | 3.9 | 37 |

What is claimed is:

1. A composition of matter consisting essentially of a wax in admixture with from about 2 to about 60 percent based on the weight of said wax of an ethylene-vinyl ester-acrylic acid terpolymer comprising from at least about 65 weight percent combined ethylene, from about 1 to about 25 weight percent of combined copolymerizable vinyl ester, and from 3.6 to about 10 weight percent of combined acrylic acid.

2. The composition of claim 1 wherein the wax is paraffin wax.

3. The composition of claim 1 wherein the copolymerizable vinyl ester is vinyl acetate.

4. The composition of claim 1 wherein the copolymerizable vinyl ester is a lower alkyl acrylate.

5. The composition of claim 1 wherein the copolymerizable vinyl ester is ethyl acrylate.

References Cited

UNITED STATES PATENTS

| | | | |
|---|---|---|---|
| 2,391,218 | 12/1945 | Bacon et al. | 260—88.1 |
| 2,406,039 | 8/1946 | Roedel. | |
| 2,523,705 | 9/1950 | Lovell et al. | |
| 2,527,081 | 10/1950 | Ramsey et al. | 260—88.1 |
| 2,791,569 | 5/1957 | Backlund. | |
| 2,877,196 | 3/1959 | Reding. | |
| 3,132,120 | 5/1964 | Graham et al. | |
| 3,201,374 | 8/1965 | Simms. | |
| 3,215,657 | 11/1965 | Beresniewicz et al. | |
| 3,215,678 | 11/1965 | Adelman. | |

ALLAN LIEBERMAN, Primary Examiner

P. R. MICHL, Assistant Examiner